3,277,173
PROCESS FOR PREPARING AROMATIC
POLYAMINES
Eugene L. Powers and Irvin B. Van Horn, New Martinsville, W. Va., assignors to Mobay Chemical Company, Pittsburgh, Pa., a corporation of Pennsylvania
No Drawing. Filed June 13, 1963, Ser. No. 287,524
4 Claims. (Cl. 260—570)

This invention relates to aromatic polyamines and, more particularly, to an improved method of preparing aromatic polyamines having a high ratio of a certain isomer.

It has been proposed heretofore to prepare methylene dianilines and higher polyamines by reacting aniline with formaldehyde. Various positional isomers are possible from this solution, including the 4,4'-isomer, the 2,4'-isomer and the 2,2'-isomer. When either the 4,4'-isomer or the 2,4'-isomer reacts further with another mol of aniline and another mol of formaldehyde, identical products having the formula:

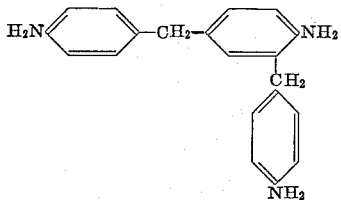

are obtained.

When the reaction between the aniline and formaldehyde is carried out at a low aniline to water ratio, the diamine formed is more than 90 percent of the 4,4'-isomer. An aromatic polyisocyanate prepared by phosgenating the mixture of amines prepared by reacting aniline with formaldehyde at a low aniline to water ratio has a relatively high tendency toward crystallization. For the preparation of aromatic polyisocyanates, it would be desirable to produce a product having reduced tendency to crystallize. This could be accomplished by increasing the isomer content of the diamine in the mixture of amines for phosgenation other than the 4,4'-isomer.

It has not been known heretofore how to prepare a mixture of diamines which contained less than 90 percent of the 4,4'-isomer.

It is therefore an object of this invention to provide a method of preparing polyamines wherein the diamines in the resulting mixture are present in an amount of less than 90 percent as the 4,4'-isomer. Another object of this invention is to provide a method of preparing a methylene diamine which is high in 2,4'-isomer content. A further object of this invention is to provide a method of preparing organic polyisocyanates which has less tendency to crystallize. A further object of this invention is to provide an improved method of preparing a mixture of amines suitable for reaction with phosgene to prepare improved organic polyisocyanates.

The foregoing objects and others are accomplished in accordance with the invention, generally speaking, by providing a method of preparing polyamines, the diamine content of which is high in 2,4'-isomers from aniline and formaldehyde in the presence of a controlled amount of water, the weight ratios of aniline to water including the water of condensation being at least about 1 to 1. The invention also contemplates the organic polyisocyanates prepared by phosgenation of the resulting mixture of polyamines.

When the aniline to water ratio is 4 to 1 or more, the 2,4'-isomer content in the diamines resulting will be above about 10 percent. It is preferred that the aniline to water ratios be above about 15 to 1 as this will produce a 2,4'-isomer content of the total diamine present above about 15 percent. Exceptionally high aniline to water ratios above about 50 to 1 yield only slight improvements in the amount of 2,4'-isomer content as compared to the amount obtained at 50:1. Consequently, a preferred range for aniline to water including the water of condensation is from about 4 to 1 to about 50 to 1, which yields a 2,4'-isomer content in the diamine within the range of from about 10 percent to about 35 percent.

The invention, in a preferred embodiment, contemplates reacting aniline with formaldehyde in the presence of a catalytic amount of a strong Lewis acid by mixing at least 1 mol of aniline per mol of formaldehyde in an aqueous solution or using only the water of condensation as is necessary to have an aniline to water weight ratio within the range of from 4 to 1 to 50 to 1. When prepared continuously, it is preferred to cause turbulent flow at a Reynolds number of from about 4500 to about 100,000 and preferably from about 10,000 to about 100,000. Turbulence in this range is essential for a continuous process in order to mix the components and maintain the required relative concentration of components to produce the desired isomer content while avoiding high molecular weight polymers.

Any suitable precursor of formaldehyde may be used, such as, for example, paraformaldehyde, methylal and the like. Paraformaldehyde is not suitable for the continuous reactor process because it is difficult to introduce.

Any suitable catalyst for the condensation of said amine with said aldehyde may be used, but it is preferred to use a strong Lewis acid including for example, hydrochloric acid, sulfuric acid, perchloric acid, hydrobromic acid, boron trifluoride, tin tetrachloride, phosphorous trichloride, phosphorous oxychloride, thionyl chloride, aluminum trichloride, iodine, bromine, benzoyl chloride, phthalyl chloride, benzyl chloride and the like.

While a batch-wise condensation may be used and some benefit from the invention may be derived by controlling the aniline to water ratios in a batch process, it is strongly preferred that the reaction be carried out under continuous conditions which will cause turbulent flow at a Reynolds number of from about 4500 to about 100,000, and preferably in the range of about 10,000 to 100,000. Any suitable method of carrying out mixing which will give this Reynolds number is satisfactory. If the Reynolds number is allowed to fall below about 4500, there is often a plugging of the equipment and, moreover, the mixing is insufficient to yield a satisfactory product because the ratio of components varies. A satisfactory mixing device for obtaining the turbulence required in the method of this invention can be of simple construction. For example, a ¼-inch pipe may be used to form an L with another ¼-inch pipe and at the base of the L, an additional pipe may be coupled to provide for injection of one component into the other. In such equipment, the pipe in the base of the L may be of, for example, ¼ inch outside diameter stainless steel tubing, which is inserted into the ¼-inch iron pipe with a coupling which permits the injection end of the pipe to pass the injection point of the L so that when amine salt is injected through the L position, an aqueous solution of aldehyde may be injected through the stainless steel tubing, and particularly through a $\frac{1}{32}$-inch hole in the end of the stainless steel tubing to produce very high turbulence in the mixing zone. Of course, the pipes may be jacketed for either cooling or heating of the reaction mixture and suitable valves may be provided so that the turbulent reaction mixture is continuously drawn off to a tower for digestion of the intermediate product followed by neutralization and separation of the resulting product. It may be desirable in some cases to separate the addition of one component and the other and use the various injection nozzles along the pipe reactor; or various points of introduction without nozzles may be provided, so long as turbulent flow is created throughout at least a portion of the continuous reaction zone.

The initial product from the turbulent zone is preferably digested in a separate digestion zone. Any suitable method for carrying out the digestion of the initial reaction product to achieve complete reaction and the ensuing separation of the organic and inorganic layer may be used. The digestion step is dependent on time, temperature and catalyst concentration. If one is willing to suffer the disadvantage of extended reaction times, then lower temperatures may be employed, from, e.g., room temperature to, for example, 75° C. Temperatures above 75° C. are preferred, however, in the interest of shortening the digestion period. Digestion is preferably accomplished in two stages and is continued in any case until digestion is substantially complete. The two stage process preferably takes place in an initial stage at 50° to 90° C. and, in a second stage, at a temperature between about 90° C. to about 150° C. In this event, total digestion times will be less than about six hours. The material from the digestion step is then placed in another vessel which has caustic in it in an amount sufficient to react with the hydrochloric acid initially used, and preferably in a stoichiometric amount. The material is thus neutralized at about 75° C. to about 100° C., preferably 90° C., for optimum separation of the organic and inorganic layer. The desired organic layer is drained from the bottom of the reaction mixture, and the amine product is put into a distillation apparatus where excess aniline and water are distilled off. The crude mixture of amines may then be filtered to remove any residual salt. Of course, it is also possible to distill out the various lower isomers, but separation of the higher polymers from each other is very difficult. It is preferred in accordance with the invention to use the initial product containing both diamines and higher polyamines for further reaction with phosgene to prepare a mixture of organic polyisocyanates.

It is not only the ratio of aniline to water which is important in the process of the invention, but the ratio of aniline to formaldehyde should also be carefully controlled and preferably within the range of from about 1.4 to 1 to about 4 to 1. In other words, one should preferably have not less than about a 30 percent molar deficiency of aniline, and there is no real advantage to having more than 100 percent molar excess of aniline.

It must be pointed out that the aniline to water ratio may only vary from 1 to 1 to 4 to 1 when the reaction is carried out continuously. In the old batch technique, as in U.S. Patent 2,818,433, at aniline to water ratios of about 2 to 1, more than 90% of the diamine formed is the 4,4'-isomer. Temperature may also be a factor because as the temperature is increased in a continuous process, the percent of 2,4'-isomer increases. This is further illustrated by the working examples given below since in the batch technique of Example 1, an aniline to water ratio of 4 to 1 gives 11 percent of the 2,4'-isomer, while an aniline to water ratio of 1.7 to 1 in Example 2 gives 2,4'-isomer content of 11 percent. A preferred aniline to formaldehyde ratio is from about 1.6 mols of aniline per mol of formaldehyde to about 3.2 mols of aniline per mol of formaldehyde. While excesses above 100 percent may be used, they are uneconomical and anything above 300 percent molar excess is very uneconomical because of the problem of separating the excess amine from the desired product. When molar deficiencies or molar excesses are referred to, it is understood that an equivalent amount herein is two mols of aniline per mol of formaldehyde or other aldehyde, since two mols of aniline will theoretically react with one mol of formaldehyde to yield one mol of diamino diphenyl methane.

For some products, it is desirable to make a crude reaction product of amines which has from about 40 to about 95 percent diamine. For others, it is desirable to make a product which is almost entirely diamine. By suitable adjustment of the ratios of components and the amount of water, it is possible to produce any desired ratio of diamine to higher polyamines.

The reaction may be carried out at any suitable temperature. It is preferred to have the reactants warm enough so they will flow easily, but below the boiling point at the operating pressure. It is to be pointed out that the reaction may be carried out under pressure. At low pressures, it is preferred that the aldehyde, and preferably formaldehyde, be added at ambient temperatures and the aqueous solution of aniline mixed with aniline hydrochloride or other salt be added at a temperature of about 45° C. to about 65° C. The reaction is exothermic and the reactants will continue to react and exotherm as they proceed through the continuous mixing device. In some cases, therefore, it may be necessary to cool the reaction mixture, but in most cases, the reactants can be allowed to exotherm without added cooling.

The mixture of amines obtained in accordance with this invention may then be phosgenated to prepare a mixture of organic polyisocyanates. Any suitable phosgenation reaction may be used such as that disclosed, for example, in U.S. Patents 2,683,160, 2,683,730, 2,875,226 and the like. It is preferred in accordance with the present invention to carry out the reaction of the mixture of amines with phosgene in two stages; by first reacting phosgene with the mixture of amines to form a carbamyl chloride-amine hydrochloride slurry and subsequently reacting the slurry with further phosgene to form the mixture of isocyanates. The first stage is preferably carried out at a temperature of from about −20° C. to about 90° C. and the second stage is preferably carried out at a temperature of from about 90° C. to about 200° C. Thus, in accordance with the method of the present invention, which involves the preparation of organic polyisocyanates, the phosgene and the mixture of amines is conducted at such a temperature that the isothermic reaction occuring when these two components are combined is not substantially above about 90° C. and then the carbamyl chloride-amine hydrochloride slurry is reacted with further phosgene at a temperature above about 90° C. to prepare the organic polyisocyanate. It is also preferred to carry out the phosgenation of the amine in an inert organic solvent. For this purpose, both amine and the phosgene are premixed with the organic solvent and then reacted in solution in two stages as set forth above to prepare the organic polyisocyanate. It is also preferred to use a high-speed mixer for contacting the phosgene solution and amine solution in the preparation of the initial carbamyl chloride-amine hydrochloride slurry.

Any suitable high speed mixer is contemplated by a preferred embodiment of the invention, such as, for example, turbomixers, colloid mills, pumps including centrifugal pumps, and the like, which contain structural elements which rotate at high speeds and thus insure intimate contact between the amine and phosgene within a relatively short period of time. Preferably, the high speed mixer should be one which rotates at a speed of about 100 r.p.m. or more.

Any suitable organic solvent which is inert to the amine, to the resulting isocyanate and to phosgene may be used. Thus, suitable solvents are, for example, those which have the formula:

wherein R is the same or different and is lower alkyl, hydrogen, halogen, nitro, aryloxy, alkoxy, as well as hydrocarbons, ethers, esters, and the like. Any suitable lower alkyl group may be used and those which contain from 1 to 4 carbon atoms are preferred such as, for example, methyl, ethyl, propyl, isopropyl, butyl, tertiary butyl as well as alkylene radicals yielding fused ring systems, for example, a butylene radical as in indene and the like. Any suitable halogen may be used such as, for example, chlorine, bromine, iodine, fluorine and the like. Any suitable aryloxy radical may be used such as, for example, phenoxy, cresoxy, ethylphenoxy, and the like. Any suitable alkoxy radical may be used such as, for example, ethoxy, methoxy, propoxy, butoxy, and the like. Furthermore, mixtures of hydrocarbons such as kerosene may be used. Examples of specific compounds are benzene, toluene, xylene, chlorobenzene, o-dichlorobenzene, tetrahydronaphthylene, 2,4-dichlorotoluene, 4,4'-dichlorodiphenyl, nitrobenzene, cyclohexane, durene, o-, m-, p-cymenens, dodecyl naphthylene, ethyl acetate, diphenyl and the like. Likewise, any suitable inert organic solvent including those just mentioned may be used for forming the solution or suspension of amine. The amount of amine and phosgene in the solution or suspension may be varied over a wide range without adversely affecting the yield to the extent that the yield is affected by similar variations in heretofore known cold phosgenation.

The products of the invention are useful for the preparation of organic polyisocyanates or they may be used for the preparation of epoxy resins in accordance with well-known processes. The organic polyisocyanates can, in turn, be used for the preparation of polyurethane plastics which are useful as elastomers, foams for insulation, coatings, adhesives and the like.

The invention is further illustrated by the following examples in which parts are by weight unless otherwise specified.

*Example 1*

A 36 percent solution of HCl is added to aniline so that about 5.0 molar percent of the $NH_2$ groups of the aniline form the amine hydrochloride, i.e. 5.5 grams of 36 percent HCl solution are added per 100 grams of aniline. The reaction temperature is then raised to about 85° C. and paraformaldehyde is added in an amount calculated to produce predominantly diamine. The weight ratio of aniline to water in the reaction medium, including the water of condensation, is calculated as shown in the following table, resulting in the isomer content indicated. The reaction mixture in this batch process is digested for about 3 hours at about 100° C. and then a stoichiometric amount of sodium hydroxide in concentrated solution is added to neutralize the HCl and excess aniline is removed by distillation.

TABLE 1

| Aniline to Water | 2,4'-Isomer Content in the Diamine, Percent |
|---|---|
| 4 | 11 |
| 8 | 14 |
| 15 | 18.5 |
| 22 | 23 |
| 30 | 28 |
| 45 | 32 |
| 70 | 37 |

About 100 parts of the mixture of amines prepared at each of the aniline to water ratios given in Table 1 are mixed with about 900 parts o-dichlorobenzene and the resulting solution is added to about 200 parts of phosgene dissolved in about 1100 parts of o-dichlorobenzene with cooling while maintaining the temperature below about 75° C. A slurry is obtained which is heated to the boiling point of the mixture while an additional 200 parts of phosgene are added to complete the reaction. The resulting solution is heated and thus distilled under about 50 mm. Hg pressure until a pot temperature of about 140° C. is reached. Then, the pressure is gradually reduced, while maintaining the pot temperature at about 140° C. to about 10 mm. Hg. The final traces of solvent are moved by raising the temperature to about 175° C. while maintaining the pressure at about 1 mm. Hg. As the aniline to water ratio and the corresponding 2,4'-isomer content of the diamine increases, the resulting isocyanate has reduced tendency to crystallize.

*Example 2*

In the examples given below in Table 2, aniline is first reacted with concentrated HCl in an amount sufficient to react with substantially all of the $NH_2$ groups. The resulting amine hydrochloride is introduced into a reaction zone in a ¼ inch pipe which has a stainless steel injection nozzle just past the entry pipe for the aniline hydrochloride and then an aqueous solution of formaldehyde is introduced through the stainless steel injection nozzle so that turbulent flow at a Reynolds number of about 6,000 is obtained. The reaction mixture is maintained at a temperature of 60° C. The condensation product from the pipe reactor is collected and reacted at the digestion temperature of about 100° C. for about three hours and then the product is neutralized with a stoichiometric amount of sodium hydroxide in concentrated aqueous solution and the excess aniline is distilled off. The amounts in the table indicate the percentage of the diamine which is 2,4'-isomer, at the given ratios of aniline to water.

TABLE 2

| Aniline to Water | 2,4'-Isomer Content in the Diamine, Percent |
|---|---|
| 1.7 | 11 |
| 2.7 | 15 |
| 4.3 | 22 |

It is to be understood that the foregoing examples are given for the purpose of illustration and that any other suitable acid catalyst, precursor of formaldehyde, aniline or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of preparing a mixture of polyamines which comprises reacting aniline with formaldehyde in the molar ratio of at least about one mol of aniline per mol of formaldehyde in the presence of water, the weight ratio of aniline to water including the water of condensation being within the range of from about 1:1 to about 4:1, said process being carried out by continuously introducing aniline and formaldehyde into a reaction zone under conditions which cause turbulent flow at a Reynolds number of from aobut 4500 to about 100,000, the resulting mixture of polyamines having a diamine content which is made up of about 10% to about 35% 2,4'-isomer.

2. The method of claim 1 wherein the reaction is carried out while the reactants are mixed with a strong Lewis acid.

3. A method of preparing a mixture of polyamines which comprises reacting aniline with formaldehyde in the molar ratio of about 1.4 to about 4 mols of aniline per mol of formaldehyde in the presence of water, the weight ratio of aniline to water being from about 4:1 to about 50:1 to produce a mixture of polyamines, the diamine content of said mixture containing from about 10 percent to about 35 percent 2,4'-isomer.

4. The method of claim 3 wherein the reaction is carried out while said reactants are mixed with a strong Lewis acid.

References Cited by the Examiner

UNITED STATES PATENTS

| | | | |
|---|---|---|---|
| 1,803,331 | 5/1931 | Kladiviko | 260—570 |
| 1,915,108 | 6/1933 | Horst | 260—570 |
| 1,954,484 | 3/1934 | Mattison | 260—570 |
| 2,261,002 | 10/1941 | Ritter | 260—570 |
| 2,683,730 | 7/1954 | Seeger et al. | 260—570 |
| 2,732,392 | 1/1956 | Saunders et al. | 260—453 |
| 2,733,254 | 1/1956 | Allen et al. | 260—453 |
| 2,818,433 | 12/1957 | Erickson | 260—570 |
| 2,822,373 | 2/1958 | Beck | 260—453 |
| 2,828,341 | 3/1958 | Adams et al. | 260—570 |
| 2,837,530 | 6/1958 | Oppliger et al. | 260—570 X |
| 2,938,054 | 5/1960 | Demers et al. | 260—570 |
| 2,974,168 | 3/1961 | Sharp et al. | 260—570 |
| 3,097,191 | 7/1963 | France et al. | |
| 3,163,666 | 12/1964 | Kirss et al. | |

OTHER REFERENCES

Richter, "Beilstein's Handbuch der Organischen Chemie," vol. 13, 2nd Supplement, pages 110–111 (1950).

CHARLES B. PARKER, *Primary Examiner.*

DALE R. MAHANAND, ROBERT V. HINES,
*Assistant Examiners.*